United States Patent [19]
Maddocks

[11] Patent Number: 5,207,310
[45] Date of Patent: May 4, 1993

[54] VIBRATORY CONVEYOR

[75] Inventor: Keith L. Maddocks, Cambridge, United Kingdom

[73] Assignee: K.M.G. Systems Ltd., United Kingdom

[21] Appl. No.: 899,775

[22] Filed: Jun. 17, 1992

[30] Foreign Application Priority Data

Jun. 18, 1991 [GB] United Kingdom ............... 9113093

[51] Int. Cl.$^5$ ..................... B65G 25/00; B65G 47/46
[52] U.S. Cl. ..................................... 198/370; 198/609; 198/769; 198/761
[58] Field of Search ............... 198/370, 609, 752, 769, 198/761, 760, 763

[56] References Cited

U.S. PATENT DOCUMENTS 3,550,752 12/1970 Gregor.
3,731,787 5/1973 Gregor.
3,917,050 11/1975 Gregor.

FOREIGN PATENT DOCUMENTS 0370609 5/1990 European Pat. Off..
1270076 4/1972 United Kingdom.
1319669 6/1973 United Kingdom.
1448362 9/1976 United Kingdom.
1487448 9/1977 United Kingdom.

Primary Examiner—D. Glenn Dayoan
Attorney, Agent, or Firm—Basile and Hanlon

[57] ABSTRACT

A distribution system including a vibratory conveyor having a number of conveyor modules to distribute bulk food products to packaging machines at user locations. The product is fed using longitudinal vibration of a product carrying tray mounted on leaf springs which resist lateral vibration. At the downstream end only of the conveyor, additional lateral vibration is induced by vibrating the base on which the leaf springs are mounted. First and second electromagnetic drives for the longitudinal and lateral vibrations are controlled by a clock pulse generator to operate in synchronism, either in phase or in anti-phase, and are controlled independently of each other as to operation and amplitude. The arrangement enables optimized distribution of fines in the bulk food product.

12 Claims, 3 Drawing Sheets

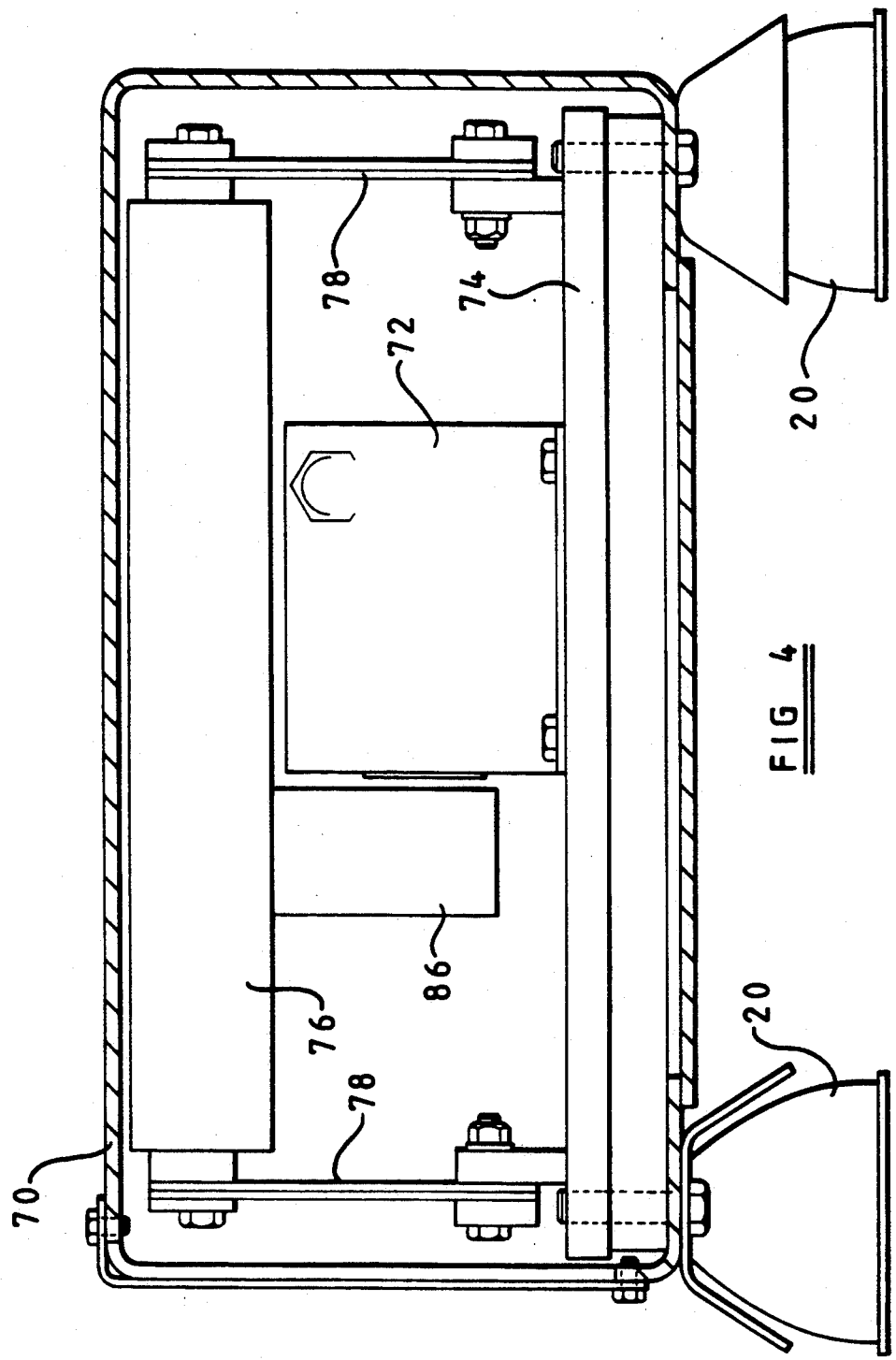

VIBRATORY CONVEYOR

BACKGROUND OF THE INVENTION

1. Field of the Invention

The present invention relates to a distribution system for conveying flowable material from a source downstream to a user location.

Distribution systems are used, inter alia, for conveying bulk food products such as crisps, cornflakes and similar products of relatively low mass and irregular shape from a source, such as an oven, to a number of processing points at which the product is, for example, packaged by packaging machines which dispense metered quantities of the product to successively presented packages or containers.

One of the problems associated with such distribution systems is that the fines of a product tend to collect at the first few outlets of the distribution system, as a result of which packages of the product from these outlets tend to have a greater than average content of fines. The term "fines" refers to the very small and sometimes powdery particles of the product which are well below the average size that is acceptable to the consumer.

The present invention seeks to provide an improved distribution system.

SUMMARY OF THE INVENTION

Accordingly, the present invention provides a distribution system for conveying flowable material from a source downstream to a user location. The distribution system includes a conveyor means having at least one elongate primary conveyor section which is vibratable for conveying the material towards the user location. The conveyor section has a product-carrying surface and side walls upstanding on the surface and an opening in one side wall at or adjacent a downstream end of the conveyor section for allowing product to fall from the conveyor section.

A first electromagnetic drive means is provided for vibrating the conveyor section longitudinally and a second electromagnetic drive means is provided for vibrating the downstream end of the conveyor section laterally of its longitudinal axis.

The primary conveyor section may be supported by a plurality of leaf springs permitting the longitudinal movement but resisting lateral movement of the conveyor section whereby drive from the first electromagnetic drive means can vibrate the primary conveyor section longitudinally of its axis. Preferably, the primary conveyor section is supported in a substantially horizontal orientation on a base.

The second electromagnetic drive means may be provided within the base at or adjacent the downstream end of the conveyor section. The second electromagnetic drive means may be rigidly secured to the base and may comprise an electromagnet and a weight, the weight being mounted on leaf springs permitting movement of the weight laterally of the longitudinal axis of the conveyor section but resisting movement longitudinally thereof, whereby drive from the second electromagnetic drive means can vibrate the downstream end of the primary conveyor section laterally of its axis.

One or both of the electromagnetic drive means may be energized in response to a pulse from a clock pulse generator. The first and second electromagnetic drive means may operate in synchronism with each other, either in phase or in anti-phase. The drive means may be controlled independently of each other. The amplitude of vibration of each electromagnetic drive means may also be selectively variable.

BRIEF DESCRIPTION OF THE DRAWINGS

The present invention is further described hereinafter, by way of example, with reference to the accompanying drawings, in which:

FIG. 4 is a cross sectional elevational view of a drive system for the primary conveyor of FIG. 3.

DESCRIPTION OF THE PREFERRED EMBODIMENT

Figure 1:
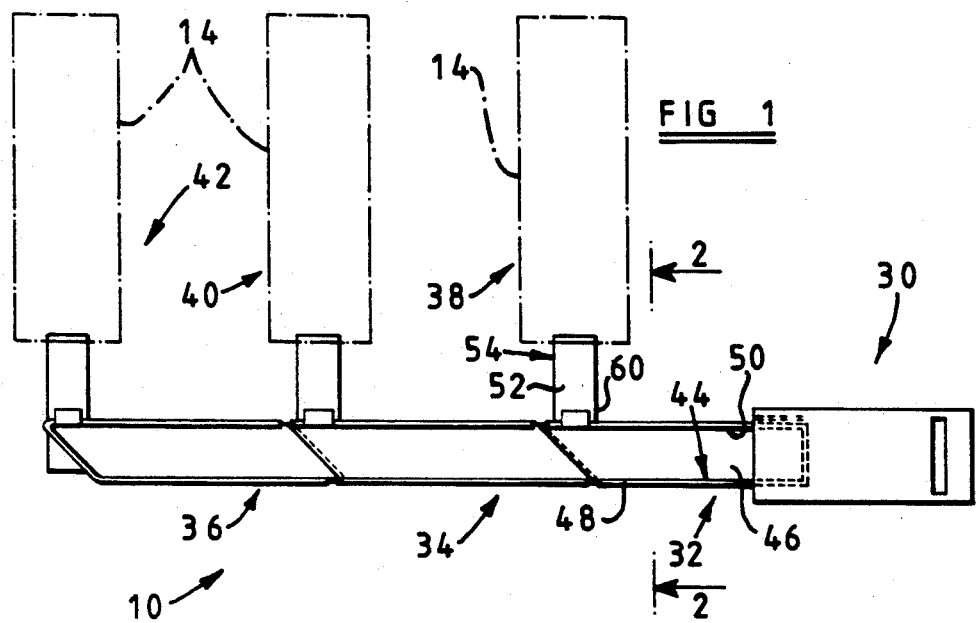
FIG. 1 is a plan view of a distribution system for a food product.

In the drawings, FIG. 1 shows a distribution system 10 which distributes a product such as crisps to, for example, packaging machines 14 located at respective user locations. The product is conveyed from right to left as seen in FIG. 1 and the distribution system comprises a number of conveyor modules 32, 34 and 36 associated with respective user locations 38, 40 and 42 at which packaging machines 14 are located. The conveyor modules are arranged in nested form to provide a continuous flow path of product to the user locations. The conveyor modules are substantially identical and only the first conveyor module 32 is described below in detail. It will be appreciated, therefore, that the following description of conveyor module 32 applies equally to conveyor modules 34 and 36.

The conveyor module 32 comprises an elongate vibratory primary conveyor section which includes a product-carrying tray 44. The tray 44 is orientated with its longitudinal axis substantially horizontal and is supported on a base 70 by leaf springs 45 which allow movement of the tray 44 relative to the base 70 longitudinally of the tray 44 but which resist movement of the tray 44 laterally of its axis relative to the base 70.

A side wall 50 of the tray 44 is provided with an opening at or adjacent the downstream end of the tray 44 to allow product to fall from the tray 44 onto a tray 52 of a secondary conveyor section 54 of a cross feed conveyor module. The latter tray 52 is arranged with its longitudinal axis preferably extending substantially at right angles to the axis of the tray 44 to carry product to the associated packaging machine 14.

The downstream end edge of the tray 44 overlaps the beginning of the tray of the next successive conveyor module 34 with a vertical drop of typically 25 mm (1") between the two product carrying surfaces of the trays.

Figure 3:
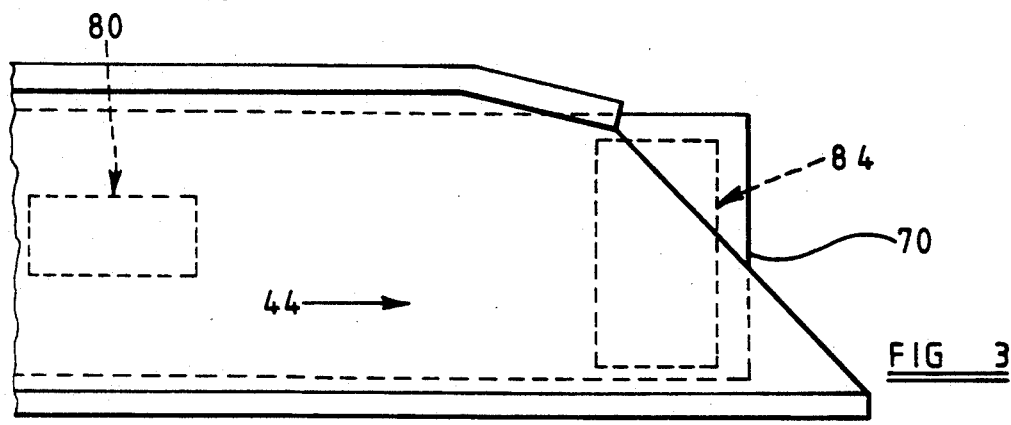
FIG. 3 is a plan view of a downstream end of a primary conveyor section of the primary conveyor of FIG. 1.
Figure 5:
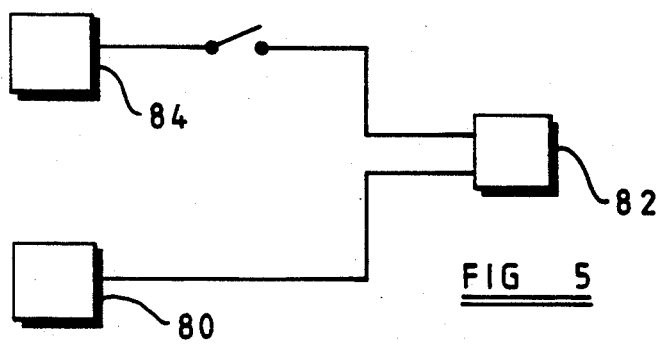
FIG. 5 is a block circuit diagram of a control system for the drive system of FIG. 4.
Figure 2:
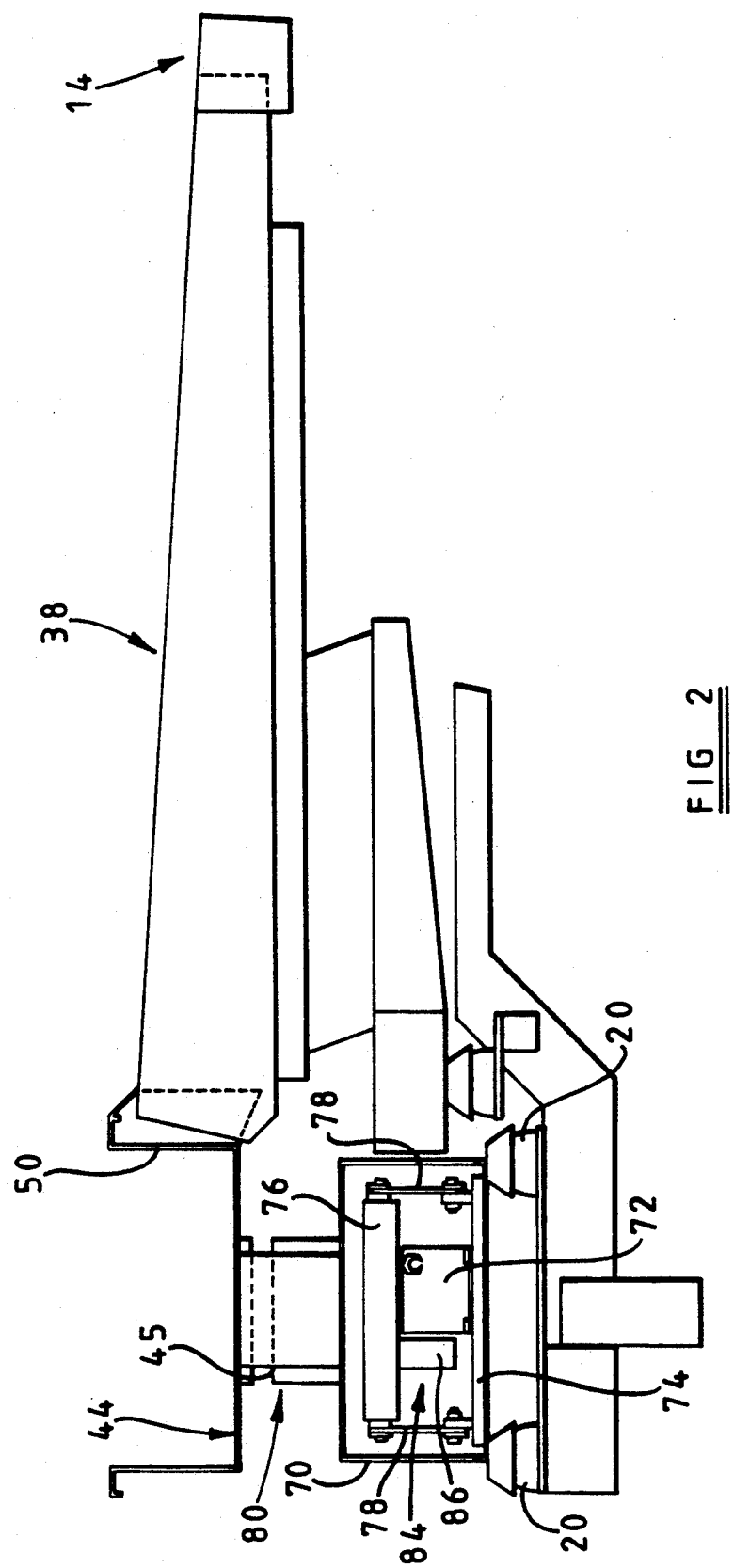
FIG. 2 is a cross sectional view generally taken along line 2—2 of FIG. 1.

As shown in FIGS. 2, 3 and 4, the base 70 is resiliently supported on a series of resilient members 20, preferably blocks of rubber or plastic material, and carries an electromagnetic drive 80 which comprises an electromagnet mounted in the base 70 and an armature secured to the underside of the tray 44. The electromagnetic drive receives control pulses from a clock pulse generator 82, as shown in FIG. 5. On receipt of each pulse from the clock pulse generator 82, the electromagnetic drive 80 drives the tray 44 against the reaction of the leaf springs 45, longitudinally of the tray 44 a pre-selected distance in the downstream direction. On de-energizing of the electromagnetic drive after each clock pulse, the leaf springs 45 draw the tray 44 back towards its rest position. The amplitude of vibration of the tray 44 is conveniently adjustable.

The tray 52 of the secondary conveyor section 54 is mounted in a similar manner as the tray 44 and is also conveniently vibrated using an electromagnet which is pulse energized at a preselected pulse frequency to provide the desired frequency of vibration of the tray 52. The use of electromagnets to vibrate the trays 44 and 52 enables the amplitude of vibration of the trays to be controlled by varying the amplitude of the energizing pulses applied to the electromagnets. This provides an effective and simple way of controlling the product feed rate to the associated packaging machines 14.

The downstream end of the tray 44 is also provided with a further electromagnetic drive system 84 to vibrate the tray 44 laterally of its longitudinal axis. The drive system 84 is mounted inside the base 70 of the primary conveyor section and comprises an electromagnet 72 rigidly secured on a base plate 74 which, in turn, is rigidly secured to the base of the primary conveyor section. A large weight 76 of typically several kilograms is also mounted on the base plate 74 by way of leaf springs 78 which allow oscillation of the weight 76 laterally of the longitudinal axis of the primary conveyor section; but which restrict or prevent movement of the weight in the longitudinal direction of the conveyor section. The weight 76 is conveniently in the form of a rectangular block having a depending portion 86 which is acted upon by the electromagnet 72.

Ideally, the weight 76 is mounted for oscillation in a direction at right angles to the longitudinal axis of the conveyor section. When the electromagnet 72 is energized in response to generation of a pulse from the clock pulse generator 82, it attracts the depending portion 86 of the weight 76, drawing the depending portion 86 towards the right as seen in FIG. 4. On de-energization of the electromagnet 72, the leaf springs 78 resile to return the weight 76 through its rest position in a simple harmonic motion. Because the electromagnet 72 is mounted on the resilient members 20 through the base 70 of the primary conveyor section, the electromagnet 72 and therefore the conveyor tray 44 move to the left as seen in FIG. 4 at the same time as the weight 76 is drawn to the right, and resiles to the right on de-energization of the electromagnet 72.

It can be seen, therefore, that a pulsed actuation of the electromagnet 72 vibrates the base 70 and therefore the tray 44 laterally of its longitudinal direction at the downstream end of the primary conveyor section. Because the primary conveyor section is vibrated laterally only at its downstream or discharge end the amplitude of lateral vibration gradually diminishes towards the upstream end of the conveyor section to effectively zero. As a result of this, the vibratory movement of the food product at the upstream end of the primary conveyor section has a major component in the longitudinal direction of the conveyor section and a minimal or no component laterally of the conveyor section. As the food product moves along the conveyor section towards the discharge end the lateral vibration of the conveyor section increases, increasing the lateral component of movement which is applied to the food product until it is at a maximum where it is required at the discharge end of the conveyor section. In addition, the electromagnetic drive 84 can be controlled independently of the electromagnetic drive 80 and can be switched on or off to provide an accurate control of the discharge of food product to the cross feed conveyors. In practice, the electromagnetic drive 84 is switched on for only a fraction of the time that the conveyors run in the forward direction. As a result, the fines do not tend to separate out from the product as with distribution systems having conventional drive systems and there is, therefore, a more uniform distribution of fines in the packaged product.

The use of a clock pulse generator 82 to control energization and de-energization of the electromagnetic drives 80 and 84 ensures that the drives are operated in synchronism. The use of an electromagnetic drive 84 also enables the drive to be operated 180° out of phase with the electromagnetic drive 80 which enables the food product to be selectively moved towards one side or the other of the primary conveyor section. The amplitude of lateral vibration of the primary conveyor section can also be controlled by varying the amplitude of the energizing pulses applied to the electromagnet 72.

I claim:

1. A distribution system for conveying flowable material from a source downstream to a user location, comprising:

conveyor means having at least one elongate vibratable primary conveyor section for conveying the material towards the user location, the primary conveyor section having a product carrying surface, side walls upstanding on the product carrying surface, and an opening in one side wall proximate a downstream end of the primary conveyor section;

first electromagnetic drive means for vibrating the primary conveyor section longitudinally; and second electromagnetic drive means for vibrating the downstream end of the conveyor section laterally of its longitudinal axis.

2. The distribution system according to claim 1 wherein the primary conveyor section is supported by a plurality of support means permitting the longitudinal movement thereof but resisting lateral movement.

3. The distribution system according to claim 2 wherein the support means comprises leaf springs.

4. The distribution system according to claim 2 wherein the primary conveyor section is supported in a substantially horizontal orientation on a base.

5. The distribution system according to claim 4 wherein the second electromagnetic drive means is provided within the base approximate the downstream end of the primary conveyor section.

6. The distribution system according to claim 4 wherein the second electromagnetic drive means is rigidly secured to the base and comprises an electromagnet and a weight, the weight being mounted on resilient support means permitting movement of the weight laterally of the longitudinal axis of the conveyor section but resisting movement longitudinally thereof.

7. The distribution system according to claim 6 wherein the support means comprises leaf springs.

8. The distribution system according to claim 1 wherein at least one of the first and second electromagnetic drive means is energized in response to a pulse from a clock pulse generator.

9. The distribution system according to claim 8 wherein the first and second electromagnetic drive means are operated in synchronism in phase with each other.

10. The distribution system according to claim 8 wherein the first and second electromagnetic drive means are operated in synchronism in anti-phase with each other.

11. The distribution system according to claim 8 wherein the first and second electromagnetic drive means are controlled independently of each other.

12. The distribution system according to claim 1 wherein the amplitude of vibration of each of the first and second electromagnetic drive means is selectively variable.

* * * * *